3,296,153
INSULATION MATERIAL PREPARED FROM A HALOGENATED EPOXY, SILOXANE AND A POLYAMINE-AMIDE CURING AGENT
Richard C. Snogren, Downey, Calif., assignor to North American Aviation, Inc.
No Drawing. Filed Mar. 22, 1963, Ser. No. 267,356
12 Claims. (Cl. 260—2.5)

This invention relates to an ablative thermal insulation material. More particularly it relates to a moldable epoxy resin material with improved thermal insulation and flame retardant properties.

In many situations in rocket propulsion and high speed vehicular travel in the atmosphere underlying materials require thermal protection from the large quantities of heat generated by air friction. Thermal insulation is often required when high velocity, high temperature gases impinge on a surface such as, for example, where rocket exhaust gases flow on or near a surface. The required thermal protection may be afforded by materials that ablate, sublime, melt, or undergo some chemical reaction under the influence of elevated temperatures. These materials should also be thermal insulators to minimize the quantity of heat flow to the underlying structure from the region exposed to aerodynamic heating. The materials are often used as structural members which adds the requirement that they have reasonable tensile strength, hardness and resistance to thermal shock. Since the main utility of these materials is in airborne applications, it is desirable that the density of the finished product be low. In order to prevent propagation of flame the materials should be self extinguishing in a short period of time.

The desired resistance to aerodynamic heating can be obtained by means of charring of a material and by ablation or sloughing off of material after it has reached an elevated temperature. There are a variety of ablative materials presently available for insulation of underlying structures subjected to very high aerodynamic heating rates. Plastics with glass, nylon or asbestos fibers have given some protection in the presence of aerodynamic heating. A broad variety of defects have afflicted the prior art materials and the substances used in each particular application have involved acceptance of some inferior properties in order to obtain particularly desirable properties. Many of the previously available insulating materials have demonstrated poor adhesion to metallic substrates requiring the use of mechanical fasteners or supplementary adhesives for securing prefabricated structures to the substrate. Mechanical properties of some of the insulation materials have been poor wherein they suffered from brittleness at room temperature or below, were unduly soft and weak permitting rapid erosion or were subject to cracking and spalling under thermal shock conditions. Many of the prior art materials have unusably high density for large scale application. Most of the prior art materials have involved complicated fabrication techniques including the use of high temperature and high pressure cures of the plastic materials.

With the above considerations in mind, it is a broad object of the present invention to provide a method of insulating and an ablative insulation material with improved mechanical, adhesive, ablative, thermal insulation, and flame retardant properties.

In carrying out the principles of the invention in one form there is employed as a thermal insulation a mixture of ingredients comprising a complex epoxy resin, a polyamide-polyamine resin, a liquid siloxane, a density reducing filler, tris(2,3-dibromopropyl) phosphate, and antimony trioxide.

A material compounded according to the principles of this invention is readily injected into molds with simple equipment, can be applied to surfaces by troweling, dipping or spraying when suitably thinned with solvents and easily adheres to aluminum and other metal surfaces without the use of primers, intermediate adhesives or special cleaning procedures. The material has a low temperature curing cycle so that sensitive components are not damaged in the curing of the resinous material and curing can be achieved at room temperature if desired. The material has a very low density, provides excellent thermal protection for underlying materials from aerodynamic heating or blasts of hot gases and is self extinguishing to minimize flaming and reduce fire hazards. Additionally the material suffers no cracking or loss of adhesion from underlying metallic surfaces when exposed to low temperature environments or rapid thermal cycling.

It is a broad object of this invention to provide a composition and process to minimize heat flow into components to be protected.

It is another object of this invention to provide a low density material resistant to high aerodynamic heating rates.

It is still another object of this invention to provide a material with optimum viscosity, jelling time and curing cycle for injection molding.

It is an object of this invention to provide a process for forming a layer of protective material on a surface.

It is a further object of this invention to provide a trowelable elastomeric composition with good adhesion to metallic substrates.

It is an object of this invention to provide a new thermosetting plastic composition.

It is a further object of this invention to provide a material with a desirable rate of ablation.

It is another object of this invention to provide a process for fabricating an insulating body.

It is a still further object of this invention to provide a material that is resilient, has high tensile strength and good thermal shock resistance.

It is another object of this invention to provide a material having a uniform and desirable rate of charring and ablation and which is flame retardant and self extinguishing.

It is an additional object of this invention to provide a composition of matter having a low temperature curing cycle.

Other objects and many of the attendant advantages of this invention will be readily appreciated as the same becomes better understood by reference to the following detailed description.

A class of epoxy resins included in the material employed in the practice of this invention are complex polymeric reaction products of polyhydric phenols with poly-functional halohydrins. More particularly the epoxy resin is preferred to be a diglycidyl ether of Bisphenol A type such as, for example, the adduct of the reaction of epichlorhydrin wtih Bisphenol A (bis(4-hydroxyphenyl) dimethylmethane). The resinous materials for the practice of this invention have an epoxide equivalent of 120 to 400 indicating a sufficiently low molecular weight that the resins are liquid at or near ambient temperatures (70–75° F.). Epoxide equivalents below 120 include resins with insufficient active functional groups outside of chain ends to provide adequate cross-linking to afford optimum physical properties in the cured material. Resins having larger epoxide equivalents than 400 have a viscosity at ambient temperatures that is too high for modification to form conveniently extrudable materials of the type provided by the practice of this invention. The epoxide equivalent is the weight of epoxy resin in grams which contains one gram chemical equivalent of epoxy. The characteristics of epoxy resins and the reaction parameters necessary to obtain these characteristics are amply disclosed at various places in the prior art as illustrated, for example, by U.S. Patent 2,324,483, British Patent 518,057 and British Patent 579,698, and the characteristics of some typical suitable commercially avaible resins are symmarized in Table I. Other commercial products can also be employed in the practice of this invention.

TABLE I.—EPOXY RESINS

| Trade Name and Source | Epoxide Equivalent | Average Molecular Weight | Viscosity at 25° C. Centipoise |
| --- | --- | --- | --- |
| Araldite DP-440, Ciba Co | 220-240 | 450-550 | 2,500-3,000 |
| Epi-Rez 510, Jones-Dabney Co | 180-200 | 350-400 | 9,000-16,000 |
| Epon 820, Shell Chemical Co | 175-210 | 350-420 | 4,000-10,000 |
| Epi-Rez 5077, Jones-Dabney Co | 185-195 | 360-400 | 500-700 |

It is preferred that the epoxy resin be used in a halogenated form in order to reduce the rate of charring and impart greater resistance to flaming. It is preferred that the epoxide equivalent of the resin be 200 to 320 to give an optimum range of viscosity in the uncured resinous composition. It is particularly preferred that the halogen be bromine to obtain the best reduction in flaming characteristics and the highest degree of fire resistance. The bromine in the preferred epoxy resin is located in an aliphatic trans position from the epoxide linkage and the epoxy resin has the molecular structure

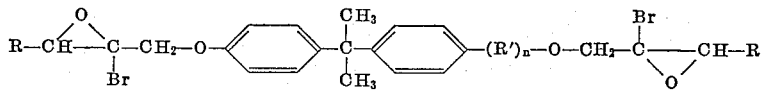

where R is selected from the class consisting of hydrogen and a repetition of the basic structural group, $n$ is not more than 0.1 and R' is

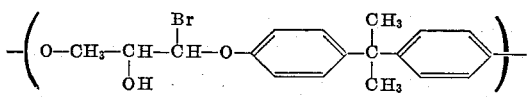

That is, less than 5% of the epoxide linkages are broken leaving a large number of epoxide bonds available for cross-linking with a polyamide-polyamine resin. A material with this molecular structure and having an epoxide equivalent of from 220 to 240 is available from the Ciba Products Company, Fair Lawn, New Jersey, under the trade name of Araldite DP-440. This range of epoxide equivalent gives the preferred stoichiometric cross-linking proportion with the polyamide-polyamine resins hereinafter described.

In order to improve the resitsance of the cured epoxy resin to ablation and in particular improve high temperature properties, a siloxane is intermixed with the epoxy resin in the practice of this invention. In one embodiment the proportion of siloxane to epoxy resin is within the range of 90 parts by weight of epoxy to 10 parts by weight of siloxane up to a proportion of 50 parts by weight of epoxy to 50 parts by weight of siloxane. The epoxy resin has a good adhesion to metallic surfaces and the siloxane has poor adhesion without the use of intermediate primers. Conversely the siloxane is superior in high temperature properties to the epoxy resin. When a proportion of epoxy resin greater than 90 parts relative to 10 parts of siloxane is used, the resulting cured material is subject to rapid erosion under the action of high temperature flowing gases with a rate of erosion and ablation that is excessively high for many applications. When more siloxane is used than about 50 parts by weight relative to 50 parts epoxy resin the resulting cured material has insufficient inherent adhesion to metallic substrates to permit thermal cycling over a large temperature range without spalling.

It is preferred that the proportion of epoxy resin to siloxane be in the range from 65/35 to 80/20 parts by weight of epoxy resin relative to the parts by weight of siloxane. This gives a preferred range of ablation characteristics wherein the siloxane resists ablation and still the cured material has sufficient room temperature structural properties to permit thermal cycling and an acceptable amount of physical abuse. Below a proportion of about 65/35 parts by weight epoxy resin to siloxane the cured material when applied to aluminum substrates without intermediate primers will sometimes exhibit spalling under severe thermal cycling. When the proportion of epoxy resin is greater than 80/20 parts by weight of epoxy resin to siloxane the material is appreciably weakened when the temperature exceeds about 500° F. and relatively rapid erosion occurs when high temperature gases are impinged on the surface.

It is particularly preferred that the proportion of epoxy resin to siloxane be about 75 parts by weight of epoxy resin to 25 parts by weight of siloxane. This proportion yields a product having uniform and desirable ablation rate with good adhesion to aluminum and other metallic substrates as well as a viscosity and relation of thixotropic properties which permit injection molding and extrusion in automatic equipment.

It is preferred that the siloxane employed in the practice of this invention be one that is liquid at ambient temperatures to provide a suitable viscosity in the uncured material. The siloxanes used in the practice of this invention preferably have non-functional substituted groups on the siloxane chain to prevent substantial formation of blocking cross linkages with the epoxy resin molecules. By having functional groups only at the chain terminations it is possible to minimize the probability of polymerization with other components of the composition with the result of a desirable and predictable range of properties in the cured material. The use of siloxanes with non-active substituted groups in combination with the described epoxy and polyamide resins permits curing the composition at ambient temperatures or at slightly elevated temperatures with no necessity for a high temperature cure nor for a high pressure cure.

In particular, it is preferred that this siloxane be selected from the group consisting of dimethyl siloxane, diethyl siloxane and methyl phenyl siloxane. The most preferred siloxane is dimethyl siloxane because of the low molecular weight for a given chain length giving the optimum reduction in viscosity and a maximum increase in ablation resistance for a given proportion of added siloxane. This probably arises from the increased strength of the silicon-oxygen bonds in the siloxane chain over the silicon-carbon bonds and the additional carbon-carbon in the siloxane chains having more complex substituted groups. It is probably because of the presence of the silicon-oxygen bonds in the siloxane that the material has a higher resistance to ablation and oxidation than the epoxy resin which has principally carbon-carbon bonds.

Other siloxanes suitable for the practice of this invention include diethyl siloxane and methyl phenyl siloxane, other straight chain polymeric siloxanes that are liquid at ambient temperatures, mixtures of liquid siloxanes from this class and low melting solid siloxanes. When mixed non-active substituted groups are present in the siloxane polymer it is prefered that at least 50 percent of the substituted groups be methyl groups.

A complex polyamide-polyamine resin is incorporated in the practice of this invention to effect cross-linking of the epoxy resin and produce a solid product with a degree of flexibility and resiliency. The polyamide-polyamine compositions which may be used for curing the epoxy resins are, in general, those derived from polymeric fatty acids and polyfunctional aliphatic amines and having an amine value in the range of 80 to 400 and a viscosity of 150 to 60,000 centipoises. The amine value is defined as the number of milligrams of potassium hydroxide equivalent to the free amine groups present in one gram of the resin as determined by titration against hydrochloric acid. Resins of this general type are disclosed and described in U.S. Patent 2,450,940.

More particularly the polyamide-polyamines employed in the practice of this invention are derived from dimerized or trimerized unsaturated fatty acids and amines having a higher functionality than ethylene diamine. These resinous products have active amine hydrogens in addition to the amide hydrogens and the amine hydrogens are capable of reacting with the epoxy resin. These resins have an amine value from 80 to 320 and a viscosity from 150 to 60,000 centipoises. This range of viscosities when combined with the other materials employed in the practice of this invention yields a viscosity in the uncured composition that is trowelable. Lower viscosity compositions have insufficient resistance to flow to prevent sagging previous to jelling of the resins. Higher viscosity compositions are not readily forced into position by hand pressure alone. The described range of amine values is preferred in the practice of this invention to provide a preferred degree of steric hindrance in the cross-linking and polymerization so as to impart flexibility and resiliency to the cured resinous material. Amine values below 80 decrease the impact resistance of the cured material, whereas amine values higher than 320 provide a cured material that is softer and more subject to erosion in areodynamic heating environments. Typical polyamide-polyamine resins suitable for the practice of this invention are commercially available from General Mills, Inc., under the trade name Versamid 125, from Jones-Dabney Company, a subsidiary of Devoe and Raynolds, Inc., under the trade name of Epi-Cure 855, and from Ciba Products Company under the trade name Lancast A. The properties of these materials are set forth in Table II.

TABLE II.—POLYAMIDE-POLYAMINE RESINS

| Trade Name | Amine Value | Viscosity, Centipoise |
| --- | --- | --- |
| Lancast A | 90–92 | 700–800 |
| Versamid 125 | 300–310 | 40,000–60,000 |
| Epi-Cure 855 | 90–92 | 150–400 |

The most particularly preferred polyamide-polyamine is an adduct of the Diels-Alder dimerization of linoleic acid which is reacted with diethylene triamine, triethylene tetramine or higher polyfunctional amines. A typical one unit structure as deduced from infra-red spectra data is

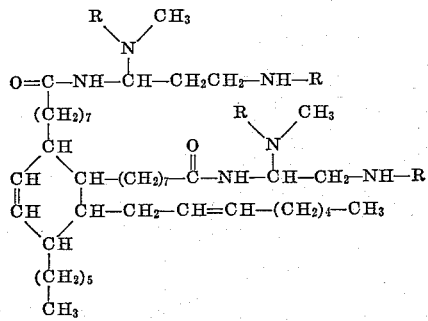

where the R groups are selected from the class consisting of hydrogen, further functional amines and another linoleic acid dimer.

The actual structure of the polymers is complex consisting of numerous isomeric products, and the mixture of isomers is best described by the measurable physical and chemical properties of the material. It is particularly preferred that the polyamide-polyamine have an amine value of 80 to 320 as described above. It is also particularly preferred that the viscosity be about 150 to 800 centipoises to give workability to the uncured resin for ease of extrusion in low pressure apparatus. Viscosities above this range yield an uncured resin that is stiff and does not flow readily into all surface details of injection molds. It is particularly preferred that the polyamide-polyamine resin have an amine value of 90 to 95. This range provides optimum stoichiometric relation to the epoxy resin to yield optimum separation of the rigid benzene rings of the epoxy molecules and consequent increased degrees of freedom for the chains to assume under stresses and impact loadings. A polyamide-polyamine resin preferred for the practice of this invention is the aforementioned Lancast A available from Ciba Products Company.

In describing the proportion of polyamide-polyamine resin added to the composition provided by the practice of this invention, a number of parts by weight are set forth. It should be understood in relation to the polyamide-polyamine resin and other materials added to the epoxy resin system that the terminology "parts by weight" means parts by weight of the subject material relative to 100 parts by weight total of epoxy resin plus siloxane.

In the practice of this invention there is provided 20 to 50 parts by weight of a polyamide-polyamine resin as has been described. When the proportion of resin is increased above about 50 parts by weight the material has an insufficiently long pot life to permit extensive manipulation of the material before jelling commences. This limits the applicability of the material in injection molding equipment and is preferably avoided. Below about 20 parts by weight of polyamide-polyamine resin, insufficient cross linking occurs in the curing process at reasonable curing temperatures and the mechanical properties of the cured epoxy resin system are decreased.

It is preferred that the proportion of polyamide-polyamine resin be in the range from 25 to 35 parts by weight, which proportion provides a preferred balance of stoichiometric proportions to the epoxy resins used in the practice of this invention. The mechanical properties of the cured resinous material are diminished both below a proportion of about 25 parts by weight of polyamide-polyamine resin and also above about 35 parts by weight. It is particularly preferred to employ a proportion of 30 to 32 parts by weight of polyamide-polyamine resin per 100 parts by weight of epoxy resin plus siloxane. This proportion gives an optimum approach to a stoichiometric mixture and sufficient cross linking to provide optimum mechanical and physical properties in the cured material.

The structure of the cured resinous material after reaction between the epoxy resin and the polyamide-polyamine resin has not been definitely ascertained. In the preferred embodiment of the invention it has been determined that the siloxane functional groups do not react with either the epoxy resin or the polyamide-polyamine resin to any great extent. This is predicated on the characteristic infra-red spectra of cured resinous materials with and without the siloxane added. The two spectra obtained closely match, especially in the region from 2 to 8 microns where the absorptions due to the functional groups are principally located. If the reactive groups of either the epoxy resin or polyamide-polyamine resin reacted with the siloxane, new chemical bonds would be formed having characteristic infra-red absorptions which are not present in the spectra of the cured material having a siloxane present.

The structure of the cured material depends upon the reactions occurring in the curing process. Some hypothesis can be made as to the reactions that are occurring and the resulting complex product. The chain initiation step probably involves an amine and an epoxide bond resulting in a new carbon-nitrogen bond on a carbon atom to which a bromine atom is attached. A proton is released from the amine and an anionic oxygen is available for chain continuation with another epoxide group on another molecule. The attack of the anionic species, whether oxygen or an amine, occurs at the most positive carbon of the epoxide group, that carbon to which the highly electro-negative bromine atom is attached. Chain linking is accomplished since the polyamide-polyamine contains several reactive amine functional groups, that can attack two epoxy chains simultaneously. As indicated a substantial proportion of epoxide-epoxide reactions will also occur. A small amount of low molecular weight polymer will result in the cured material from chain termination due to reaction of a proton from the chain initiation step with an anionic oxygen from a broken epoxide linkage. Although a probable reaction mechanism is hypothesized, it has not been determined with certainty what the reaction in the cured epoxy material has been nor is the exact structure defined. From infrared data it appears clear that minimal reaction occurs between the siloxane and other ingredients in the cured material.

In the practice of this invention a substance is preferably added to the mixture before curing to reduce the density of the cured material and to decrease its thermal conductivity. General requirements of the density reducing filler are that it have a very low density, have resistance to flaming, be in small particle size and have good adhesion with the epoxy resin employed in the practice of the invention. Thus, for example, it has been found that granulated cork, charred granulated cork, small hollow micro spheres or micro balloons of various resins such as, for example, urea formaldehyde or phenolic resins, small hollow micro spheres of glass or ceramic materials, hollow fused beads of clay or finely divided expanded minerals are suitable for the density reducing filler. Examples of several commercially available materials suitable for use as a density reducing filler are set forth in Table III along with some properties of these materials. These can be used singly as fillers or in combination with materials selected from the class shown in Table III, granulated cork and similar materials.

with the other ingredients employed in the practice of this invention, smaller particles presenting an excess of surface to be contacted by the resins and larger particles being easily broken. In addition to the resinous micro spheres have a density which is compatible with the density of solutions prepared for spraying applications so that a minimum of agitation is necessary to prevent segregation of the insoluble filler when spraying the composition.

It is particularly preferred that the thin walled hollow micro spheres employed in the practice of this invention be formed of phenolic resin. The phenolic resin micro spheres have superior resistance to chemical attack in the high temperature aerodynamic environment to which the insulation material is subjected and gives an optimum rate of charring in the presence of aerodynamic heating. The density reducing filler employed in the practice of this invention is preferably dried by heating before mixing with the other components in order to remove adsorbed water which would form objectionable vapor when subjected to the aerodynamic heating or in some curing cycles. The process of producing resinous hollow particles suitable for the practice of this invention have been disclosed and described in U.S. Patent 2,797,201. Processes for producing very small diameter hollow particles from fusible materials such as glasses, ceramics, argillaceous materials or various resins are amply described in the prior art as illustrated, for example, in U.S. Patents 1,995,893; 2,151,083; 2,553,759; and 2,676,892.

The material prepared in the practice of this invention preferably contains from 5 to 50 parts by weight of material for reducing density and thermal conductivity. If less than 5 percent of filler is used insubstantial decreases in the density of the cured material are obtained. When the proportion of density reducing filler is in excess of 50 parts by weight, the uncured composition has insufficient strength to remain a unitary body. Material with these higher proportions of density reducing filler appear dry and crumble under slight mechanical stress. It is more preferred that the resinous micro spheres be used in the range from 15 to 30 parts by weight. Below 15

TABLE III.—Properties of Hollow Micro Spheres

| Typical Composition (Percent) | Bulk Density (lb./ft.$^3$) | Size (microns) | Melting Point (° F.) | Trade Name | Source [1] |
|---|---|---|---|---|---|
| 63.6 $SiO_2$, 13.5 $Na_2O$, 6 $Na_2CO_3$, 16.9 $H_2O$. | 4-6 | 50-300 | 1,900 | Globe-O-Sil A | A. |
| 75.2 $SiO_2$, 18 $Al_2O_3$, 1.8 CaO, 0.2 MgO, 3 $Na_2O$, 1.8 $H_2O$. | 4-6 | 300-600 | 2,300 | Globe-O-Sil F | A. |
| 95 $SiO_2$, 5 $Na_2O$ | | | 3,000 | Siloons | A. |
| Borosilicate Glass | 18 | 30-300 | 1,200 | Eccospheres R | B. |
| High Silica Glass | 9.5 | 30-300 | 2,800 | Eccospheres L | B. |
| Pure Silica | | 30-300 | 3,100 | Eccospheres Si | B. |
| 53 $SiO_2$, 21.5 $Al_2O_3$, 7.2 $Fe_2O_3$, 9.2 CaO, 5.8 MgO, 0.6 $Na_2O$, 3.3 $K_2O$. | 19-27 | (2) | 1,800 | Kanamite | C. |
| Phenolic Resin | 3-5 | 5-120 | | Microballoon BJO-0930 | D. |
| Urea Formaldehyde Resin | 3.7 | 2-60 | 360 | Colfoam | E. |

[1] A. American Reinforced Plastics, Los Angeles, Calif. B. Emerson and Cuming, Inc., Canton, Mass. C. Ferro Company, Cleveland, Ohio. D. Union Carbide Company, Niagara Falls, New York. E. Air Reduction and Chemical, Cleveland, Ohio.
[2] Several graded sizes.

It is preferred that very small thin walled hollow micro spheres be employed in the practice of this invention to give maximum change in density and a minimum thermal conductivity. Preferably these particles are spherical or nearly spherical and the diameter or maximum dimension in case of asymmetry is preferably in the range of 0.001 to 0.025 inch. The use of thermosetting resin micro spheres is particularly preferred in that these materials insure that good adhesion is obtained between the density reducing filler and the epoxy resin matrix. Resinous micro spheres in the preferred size range have a desirable apparent density and sufficient mechanical strength to resist collapse and crushing upon prolonged mixing parts by weight large amounts of the epoxy resin system exists as a unitary mass, the density of which can be further reduced without substantial decrease in the physical properties of the resultant cured composition. When thin walled hollow micro spheres in excess of 30 parts by weight are employed in the practice of this invention a decrease in the cured strength of the composition is noticeable. The resultant material is thereby more susceptible to erosion by high velocity, high temperature gases. It is particularly preferred that thin walled hollow micro spheres of phenolic resin be employed in the practice of this invention in the range of 22 to 25 parts by weight per hundred parts by weight of epoxy resin plus siloxane. This particularly preferred range gives the optimum combination of low density and high ultimate physical properties of the cured composition. Increase in the proportion of particles above 25 parts by weight causes a decrease in the proportion of surface area contacted by the surrounding resin and causes a decrease in the strength of the cured composition. Lower proportions of particles below 22 parts by weight yield a composition with increased density without increase of physical strength.

In order to reduce the susceptibility of the cured composition to destruction by fire and to increase the resistance to ablation, there is preferably provided in the practice of this invention from 5 to 20 parts by weight of a fire retardant. More particularly this fire retardant comprises from 1 to 10 parts by weight of antimony trioxide and from 2 to 15 parts by weight of tris (2,3-dibromopropyl) phosphate. When less than 5 parts by weight total of fire retardant or less than 1 part by weight of antimony trioxide or 2 parts by weight of tris (2,3-dibromopropyl) phosphate is used in the material described herein erratic results are obtained in the flame testing and the resultant cured material is not considered of sufficient uniformity for quantity production, however, the material is flame retardant and operable for many applications of lower criticality of performance, a brominated epoxy resin and the siloxane providing appreciable flame resistance. When more than 20 parts by weight of fire retardant, 10 parts by weight of antimony trioxide or 15 parts by weight of tris (2,3-dibromopropyl) phosphate is incorporated in the material provided by the practice of this invention, the growth and bubbling of the fire retardant produces a weak loosely bound structure which is subject to rapid erosion in the high velocity, high temperature gases of an ablation test. It is more preferred that the antimony trioxide be in the form of powder of North Standard Fineness of grind NS6–8, that is approximately 0.0001 to 0.001" in diameter or largest dimension and that it be in the range from 3 to 6 parts by weight. It is also more preferred that the tris (2,3-dibromopropyl) phosphate be in the range of 4 to 7 parts by weight. It has been found that this range of materials gives a self extinguishing time to the cured material in American Society of Testing Materials (ASTM) standard test D635 of less than four minutes and that no degradation of the physical properties of the cured material is observed, whereas higher proportions of fire retardant cause a noticeable diminution in the physical properties of the cured material. Addition of fire retardant in these ranges gives a desirable ablation rate and it has been observed that greater uniformity in ablation is obtained by these additions. It is particularly preferred that the antimony trioxide be in the range from 4.5 to 4.7 parts by weight per hundred parts by weight of epoxy resin plus siloxane and the tris (2,3-dibromopropyl) phosphate in the range from 6.4 to 6.6 parts by weight per hundred parts by weight of epoxy resin plus siloxane. This range of fire retardant materials yields a cured resinous material which is self extinguishable in substantially less than two minutes in most cases and in all cases is less than three minutes. No diminution in the physical properties of the cured material is noted with this proportion of fire retardant and optimum ablation characteristics are observed.

In addition to the materials described above, certain additives can be made to the basic composition to improve the properties for particular applications. Thus, for example bis (2-ethylhexyl) sodium sulfosuccinate can be added in an amount of about 0.5 part by weight to improve the mixing procedure. Up to 25 parts by weight of triphenyl phosphite can be added to the material to improve the adhesion to aluminum. Also, for example, minor amounts of barium or cadmium organometallic compounds such as the alkyl aryl phosphites of barium and cadmium may be added if desired to improve the stability of the composition at elevated temperatures. Good results are obtained when such barium or cadmium alkyl aryl phosphites are added in the amounts of 0.1 up to 5 parts by weight. Examples of additive compositions include the barium and cadmium salts of fatty acids having about 8 to 16 carbon atoms such as, for example, barium octanoate, cadmium laurate and the like. It may also be desired in some applications to add up to 0.5 part by weight of polymerizing agent for the siloxane such as, for example, dibutyl tin dilaurate.

In the practice of this invention it may be desirable to employ solvents to reduce the viscosity in order to handle the material in spraying, dipping, painting or casting types of application. If this is desired a variety of solvents such as the lower ketones, lower alcohols, lower alkyl chlorides, lower alkyl benzenes and others may be used. Thus, for example, the following solvents may be used to dissolve and suspend the uncured material for ease of handling: acetone, methyl ethyl ketone, diethyl ketone, ethyl alcohol, methyl alcohol, isopropyl alcohol, butyl alcohol, ethylene trichloride, tetrachloromethane, ethyl ether, toluene, chlorotoluene, xylene and the like. It has been found that methyl ethyl ketone is a preferred solvent for reducing the viscosity of the material without changing the physical properties of the cured material and methyl ethyl ketone serves as an excellent carrier for spraying applications.

In the preparation of the materials for the practice of this invention a small quantity of the epoxy resin is mixed with the antimony trioxide and the tris (2,3-dibromopropyl) phosphate until a smooth homogeneous mixture is obtained. The balance of the epoxy resin and the siloxane are then added to the above mixture and mixed for a sufficient time to produce a smooth homogeneous mass. After these materials are thoroughly mixed micro spheres which have been dried are slowly added to the mixture during agitation or stirring. After the addition of micro spheres the material is mixed only a sufficient amount to produce a homogeneous material so that there is a minimum of collapse of the fragile micro spheres. The resultant admixture can be stored in sealed metal containers for as long as three months at a temperature below 40° F. When it is desired to use the above described admixture, it is warmed to room temperature, the polyamide-polyamine resin is added and the materials mixed for a short time until a homogeneous material is obtained. This material may be immediately used as described hereafter or may be degassed by placing in a vacuum chamber and evacuating to a vacuum of about 27" of mercury. This reduces the amount of entrained gas and produces more uniform density material and is desirable for most applications. After the polyamide-polyamine resin has been added to the mixture of other ingredients a limited time is available for forming the material into the structure to be cured. It has been found, for example, that a 240 gram sample has a pot life of about 25 minutes before jelling begins.

Material prepared in the practice of this invention is cured to rigidity and a high fraction of its ultimate condition in approximately 12 hours at ambient temperatures (70 to 75° F.). A cure of seven days at ambient temperatures produces a material that has achieved its highest ultimate physical properties. The cure can be accelerated by moderately high temperatures and is substantially retarded below about 70° F. Thus, for example, four hours at 150° F. produces the highest ultimate physical properties and a cure for 90 minutes at 215° to 220° F. also produces the highest ultimate physical properties. Temperatures above 220° F. are seldom desirable and are undesirable for thick bodies since temperature non-uniformities are present.

The uncured resinous material can be applied to various substrates in a variety of manners. The viscosity of the mixture is sufficiently low that hand operated injection equipment can be used to fill small molds. Larger molds can be filled by means of automatic equipment operating at a maximum of 80 p.s.i. air pressure. When molding the material in metal molds where it is desired to remove the material, a parting agent is used such as paraffin, carnauba or other waxes or polyvinyl alcohol. This latter material is a preferred and convenient parting agent which can be readily applied in solution in lower alcohols which are then evaporated before the injection of the resinous material into the mold. The polyvinyl alcohol can be removed from the finished part by dissolving in water.

Material prepared according to the principles of this invention has excellent adhesion to aluminium and other metallic substrates. No special preparation of the substrate is necessary except the removal of surface contamination that might form an intermediate layer between the resinous material and the metal. Thus, for example, for best adhesion the surfaces to be coated are preferably cleaned by dipping or swabbing with methyl ethyl ketone before application of the resinous material. If desired in particular applications etching of the metallic substrate can be used before application of the resinous material.

The uncured resin can be applied to a metallic or other surface by troweling. When thinned with suitable solvents as described above and properly agitated, the resinous material may be applied by means of dipping of solid pieces to be coated in a bath of the resinous material or may be applied to a surface by painting. Resinous compositions whose viscosity has been suitably reduced by the use of solvents can also be sprayed onto solid substrates. In the dipping, painting and spraying applications a coating thickness of no more than 0.060″ is preferred to allow free evaporation of solvent before complete jelling of the resinous material, which should be allowed to proceed for at least 12 hours between each application of additional resinous material. Resinous material the viscosity of which has been reduced by suitable solvents, can be cast into shallow molds without the use of pressure.

The resinous material can also be used as an insulating adhesive between solid materials. The resinous material may also be used as a sandwich material between layers of glass cloth. In this latter type of application the resinous material is spread onto the glass cloth, another glass cloth is applied over the resinous material and the composite structure pressed in a mold to the desired thickness. Samples so prepared demonstrated increased tensile and flexural strength over samples of comparable thickness without the glass cloth.

The resinous mixture can also be forced or cast into the cells of a honeycomb material to provide a structural ablative material. In this way the honeycomb provides structural support for the ablative material and the resinous material provides ablation protection for the honeycomb. Honeycombs suitable for this type of composite structure include metallic materials and cores having glass fabric, synthetic fabric, natural fiber fabrics, or parchment coated with many types of resin systems such as, for example, polyester resins, urea-formaldehyde resins, epoxy resins and phenolic resins. It is preferred that a honeycomb core having a glass fabric and an epoxy or phenolic resin be employed in this embodiment to provide optimum adhesion with the resinous ablative material, high temperature mechanical strength and low thermal conductivity. This honeycomb impregnated composite can be faced with a sheet of glass fabric before curing to add still more structural strength.

The preparation and application of the composition prepared in the practice of this invention is illustrated in the following non-limiting examples.

*Example 1.*—About 450 grams of Araldite DP–440, 153.4 grams of antimony trioxide and 215.6 grams of tris (2,3-dibromopropyl) phosphate was mixed with a small propeller type agitator until no lumps or aggregates of solid material were present and a smooth homogeneous mixture was obtained. To this was added 1069.6 grams of dimethyl siloxane and sufficient Araldite DP–440 to make 2296.0 grams total weight of Araldite DP–440. These ingredients were placed in a large double blade reversible dough type mixer and agitated for one hour with occasional reversal of the mixer to prevent accumulation of unmixed ingredients on one side of the blades.

Phenolic micro spheres were dried in an oven for about one hour at 217° F. After drying the micro spheres were passed through a sieve with approximately $\frac{1}{16}$″ square holes to substantially reduce the aggregation of micro spheres and permit homogeneous mixing with the other materials. Within one hour after removing from the oven 812.6 grams of micro spheres were added to the above described mixture in batches of 50 to 100 grams with some mixing between additions. These were added while the mixer was agitating the material and the mixer was reversed occasionally to eliminate accumulation of unmixed materials on one side of the blades. After all of the micro spheres had been added the mixer was operated with occasional reversals for a period of 20 minutes until a homogeneous mixture was obtained. The resulting material was packaged in sealed metal containers and stored at a temperature that did not exceed 40° F.

After about 3 months of storage the material had the same appearance and response to curing as freshly mixed material of the same proportions. The stored material was allowed to warm to ambient temperatures and 852.8 grams of Lancast A was mixed in with the above material in a dough type mixer for about four minutes. This was sufficient to prepare a homogeneous blend of the materials, after which the batch of material was degassed in a vacuum of about 27 inches of mercury pressure for about four minutes.

A portion of the material was injected into flat molds containing 6″ x 6″ aluminum panels which had previously been cleaned with methyl ethyl ketone. A coating of polyvinyl alcohol had been applied to all of the mold surfaces with the exception of the aluminum panels. The material was injected into the molds at about 50 p.s.i. air pressure and jelling was allowed to proceed for about 12 hours. The aluminum panels with their coating of insulation was cured for an additional two hours at a temperature of 202° to 207° F. After curing the panels had a coating of insulating material $\frac{1}{4}$″ thick. The panels and their coatings were heated to 167° F. in still air and immediately exposed to still air at −65° F. Three such cycles were conducted on each test panel and all were examined for cracks and loss of adhesion. None of the six experimental panels showed any cracking, spalling or loss of adhesion from the aluminum.

Thermal insulation specimens were prepared from a portion of the material for ablation testing. In this test the insulation material is subjected to a high temperature blast of air at a velocity of about 45 to 50 feet per second impinging on the surface of the insulation at an angle of 45°. The total heat flux on the surface is about 30 B.t.u./ft.$^2$-second and of this approximately 50 percent is radiant energy and 50 percent convective energy. The jet of high temperature air is impinged on the insulation surface for 60 seconds and the temperature at the back side of a $\frac{1}{4}$ inch thick layer of insulation is monitored during this period. The material prepared for this test was injection molded so as to form a $\frac{1}{4}$ inch thick layer on an aluminum disk with a diameter of one inch. A 36 gauge Chromel-Alumel thermocouple was imbedded in the insulation material immediately adjacent to and electrically insulated from the underlying aluminum substrate. The samples were all cured for at least two hours at 212° to 217° F. In the eight specimens prepared and tested as described, the temperature at the back side of the insulation in no case exceeded 250° F. in the 60 second period.

*Example 2.*—A few grams of Araldite DP–440 and 6.7 grams of antimony trioxide were ground in a hand mortar until a homogeneous paste was obtained. 9.4 grams of tris (2,3-dibromopropyl) phosphate was added to the mixture and intermixed until homogeneous. 46.7 grams of dimethyl siloxane and additional Araldite DP–440 sufficient to make a total of 100.0 grams of Araldite DP–440 was added to the above mixture and mixed for approximately one hour in a small blade type mixer. A quantity of phenolic micro spheres were dried at a temperature in excess of 212° F. for approximately one hour. The micro spheres were screened through a sieve with approximately 1/16 inch square openings to reduce aggregation and 34.5 grams of the spheres were slowly added to the mixture and blended until homogeneous. To the above mixture was then added 39.0 grams of Epi-Cure 855 and the mixture blended until homogeneous. A 160 gram sample was extracted and the pot life was determined to approximately 25 to 30 minutes. The material had a density of 44 pounds per cubic foot after curing.

*Example 3.*—The following ingredients were compounded according to the procedures outlined in Example 2: 100.0 grams of Araldite DP–440, 46.7 grams of dimethyl siloxane, 6.72 grams of tris (2,3-dibromopropyl) phosphate, 4.67 grams of antimony trioxide, 33.6 grams of phenolic micro spheres, and 40.0 grams of Lancast A. The material was cured for seven days at room temperature and had a density of 43 pounds per cubic foot. The material extruded well and the bars produced were self extinguishing in two to three minutes when tested according to ASTM Standard D635.

*Example 4.*—100.0 grams of Epi-Rez 5077, 50.0 grams of dimethyl siloxane, 160.0 grams of 20 to 40 mesh granulated cork, 22.0 grams of phenolic resin micro spheres and 50.0 grams of Epi-Cure 855 when combined in the same manner as illustrated in Example 2 exhibit properties similar to those set forth in the previous samples.

*Example 5.*—100.0 grams of Araldite DP–440, 33.4 grams of methyl phenyl siloxane, 1.6 grams of dimethyl siloxane, 3.5 grams of borosilicate glass micro spheres, 19.0 grams of 20 to 40 mesh granulated cork and 42.0 grams of Lancast A mixed according to the procedure described in Example 2 extrudes well and has properties similar to those of the materials described in the previous examples.

*Example 6.*—When the following materials are formulated according to the procedure set forth in Example 2: 100.0 grams of Araldite DP–440, 66.0 grams of diethyl siloxane, 35.0 grams of phenolic micro spheres, 66.0 grams of Versamid 125, and 10.0 grams of antimony trioxide, and cured at 150° F. for four hours, the resulting composition shows properties similar to those described in the previous examples.

*Example 7.*—The following materials were combined in the manner described in Example 2: Araldite DP–440, 100.0 grams; methyl phenyl siloxane, 66.0 grams; phenolic micro spheres, 35.0 grams; antimony trioxide, 10.0 grams; Lancast A, 39.0 grams; dibutyl tin dilaurate, 0.2 gram. After curing at about 215° F. for two hours this material has properties similar to those described in the previous examples.

*Example 8.*—The following materials were compounded in the same manner as described in Example 2: 60.0 grams of Epon 820, 40.0 grams of methyl phenyl siloxane, 20.0 grams of phenolic micro spheres, 8.0 grams of antimony trioxide, 25.0 grams of Lancast A and 0.16 gram of dibutyl tin dilaurate. This material was cured for 15 hours at room temperature and 4 hours at 150° F. The material has physical properties similar to the materials described in the previous examples.

*Example 9.*—The following materials were compounded in the same manner as described in Example 2: 54.0 grams of Epon 820, 6.0 grams of phenyl glycidyl ether, 40.0 grams of methyl phenyl siloxane, 15.0 grams of urea formaldehyde micro spheres, 8.0 grams of antimony trioxide, 40.0 grams of Versamid 125 and 0.16 grams of dibutyl tin dilaurate. This material when cured for 15 hours at room temperature and four hours at 150° F. has a density of 52 pounds per cubic foot and other physical properties similar to the properties of materials described in the previous examples.

*Example 10.*—The following materials were prepared in the same manner as described in Example 2: 100.0 grams of Araldite DP–440, 46.7 grams of dimethyl siloxane, 25.0 grams of triphenyl phosphite, 6.7 grams of antimony trioxide, 9.4 grams of tris (2,3-dibromopropyl) phosphate, 40.0 grams of phenolic micro spheres and 46.7 grams of Lancast A. This material was applied to aluminum in a 30 mil thickness on a 1 inch wide 1 inch lap on 2024 T3 clad aluminum and the lap shear strength tested according to Military Specification MIL A5090D. On the five specimens tested the lap shear strength averaged approximately 700 p.s.i. and in all cases 100 percent cohesive failure was obtained.

*Example 11.*—The following materials were blended according to the methods described in Example 2: 75 parts by weight of Araldite DP–440, 25 parts by weight of dimethyl siloxane, 31.3 parts by weight of Lancast A, 23.5 parts by weight phenolic resin thin walled hollow micro spheres, 6.4 parts by weight of tris (2,3-dibromopropyl) phosphate, and 4.6 parts by weight of antimony trioxide.

This material was evacuated for a short period of time to remove entrained gas bubbles and poured into a shallow flat container to a depth of slightly more than 1 inch. A sheet of honeycomb core comprising glass fabric cell walls coated with a heat resistant phenolic resin and having a cell size of ¼ inch between the flats of the hexagonal cells, a bulk density of four pounds per cubic foot and a thickness of 1 inch was pressed into the above mixture. The excess epoxy resin mixture was removed from the top surface of the honeycomb core and the material allowed to jell for 18 hours at room temperature and for four hours at 165° F. After curing this material can be sawed, milled or otherwise machined to form individual tiles or more complex geometries. This material has increased mechanical strength over materials described in the previous examples and ablation characteristics substantially the same as the materials described in the previous examples.

*Example 12.*—The following materials were mixed according to the procedure set forth in Example 2: 100.0 grams of Araldite DP–440, 46.7 grams of dimethyl siloxane, 35.5 grams of phenolic micro spheres, 6.7 grams of antimony trioxide, and 9.4 grams of tris (2,3-dibromopropyl) phosphate. After mixing, 100 grams of the resulting mixture was dissolved and suspended in 80 grams of the methyl ethyl ketone. To this solution 23.2 grams of Lancast A was added. The resultant material was sprayed with a conventional spraying apparatus with mechanical agitators and a layer of deposited material approximately 0.060 inch thick was built on 6″ x 6″ aluminum panels. This material was allowed to jell for about 12 hours at room temperature to give sufficient time for the methyl ethyl ketone to evaporate and subsequent coatings of approximately the same thickness were applied with at least 12 hours jelling time between each application until the total thickness of deposit on the aluminum was approximately ¼″. All thicknesses of the coating were allowed to jell for at least 12 hours and the composite was cured for four hours at a temperature of 165° to 170° F. Thermal shock testing as described in Example 1 on several panels indicated that no spalling or cracking was obtained in the insulation material.

It is to be understood that the above described examples are merely illustrative of the application of the principles of this invention. Those skilled in the art may readily devise other variations that will embody the principles of the invention. It is therefore to be understood that within the scope of the appended claims the invention may be practiced otherwise than as specifically described.

What is claimed is:

1. A composition of matter for providing ablation protection comprising:
   50 to 80 parts by weight of halogenated epoxy resin prepared from a diglycidyl ether of Bisphenol A,
   20 to 50 parts by weight of siloxane selected from the group consisting of dimethyl siloxane, diethyl siloxane, diethyl siloxane and methyl phenyl siloxane, the ratio of the epoxy resin to the siloxane being in the range from 80/20 to 50/50, and the total weight of said epoxy resin and the siloxane being 100 parts by weight,
   20 to 50 parts by weight of liquid polyamide-polyamine resin with an amine value of 80 to 320,
   15 to 30 parts by weight of thin walled hollow microparticles,
   4 to 7 parts by weight of tris (2,3-dibromopropyl) phosphate, and
   10 to 20 parts by weight of triphenyl phosphite.

2. A method of insulating a solid surface comprising the steps of:
   mixing together 50 to 80 parts by weight of halogenated epoxy resin prepared from a diglycidyl ether of Bisphenol A and 20 to 50 parts by weight of siloxane selected from the group consisting of dimethly siloxane, diethyl siloxane and methyl phenyl siloxane, the ratio of the epoxy resin to the siloxane being in the range from 50/50 to 80/20 parts by weight, and the total weight of said epoxy resin and said siloxane being 100 parts by weight,
   distributing uniformly in the resin-siloxane mixture 15 to 30 parts by weight of phenolic resin thin walled hollow particles, 3 to 6 parts by weight of antimony trioxide and 4 to 7 parts by weight of tris (2,3-dibromopropyl) phosphate,
   dissolving and suspending the above mixture of ingredients in methyl ethyl ketone,
   dissolving in the derived methyl ethyl ketone solution 25 to 35 parts by weight of liquid polyamide-polyamine resin with an amine value of 80 to 320,
   spraying the resulting admixture onto the solid surface,
   evaporating the methyl ethyl ketone from the deposited material,
   curing the deposited material in the temperature range from 70° to 220° F. and for a time in the range of 90 minutes to 7 days.

3. A method of insulating a structure comprising the steps of:
   forming a smooth homogeneous admixture of from 1 to 10 parts by weight of antimony trioxide, from 2 to 15 parts by weight of tris (2,3-dibromopropyl) phosphate, from 5 to 50 parts by weight of thin walled hollow micro particles, from 65 to 80 parts by weight of liquid brominated epoxy resin prepared from a diglycidyl ether of Bisphenol A having an epoxide equivalent of from 220 to 240, and from 20 to 35 parts by weight of siloxane selected from the group consisting of dimethyl siloxane, diethyl siloxane and methyl phenyl siloxane, the ratio of the epoxy resin to the siloxane being in the range from 65/35 to 80/20 parts by weight and the total of said epoxy resin and said siloxane being 100 parts by weight,
   mixing 25 to 35 parts by weight of liquid polyamide-polyamine resin with an amine value of from 90 to 95 with the above admixture,
   forming the resulting mixture into a predetermined configuration between the structure and a region subject to high temperature exposure, and
   curing the mixture for a time and at a temperature sufficient to copolymerize the epoxy resin and the polyamide-polyamine resin.

4. An ablative material comprising:
   65 to 80 parts by weight of brominated epoxy resin prepared from a diglycidyl ether of Bisphenol A and 20 to 35 parts by weight of siloxane selected from the group consisting of dimethyl siloxane, diethyl siloxane and methyl phenyl siloxane, the ratio of the epoxy resin to the siloxane being in the range from 65/35 to 80/20 parts by weight, and the total of said epoxy resin and said siloxane being 100 parts by weight,
   25 to 35 parts by weight of polyamide-polyamine resin with an amine value of 80 to 320,
   5 to 50 parts by weight of phenolic resin thin walled hollow particles,
   2 to 15 parts by weight of tris (2,3-dibromopropyl) phosphate, and
   1 to 10 parts by weight of antimony trioxide in a particle size not over 0.001 inch.

5. An ablative material comprising:
   65 to 80 parts by weight of halogenated epoxy resin prepared from a diglycidyl ether of Bisphenol A having an epoxide equivalent of 200 to 320,
   20 to 35 parts by weight of siloxane selected from the group consisting of dimethyl siloxane, diethyl siloxane, and methyl phenyl siloxane, the ratio of the epoxy resin to the siloxane being in the range from 65/35 to 80/20 parts by weight and the total of said epoxy resin and siloxane being 100 parts by weight.
   25 to 35 parts by weight of liquid polyamide-polyamine resin with an amine value of from 80 to 320,
   3 to 6 parts by weight of antimony trioxide,
   4 to 7 parts by weight of tris (2,3-dibromopropyl) phosphate, and
   15 to 30 parts by weight of resinous thin walled hollow microparticles.

6. A method for protecting a metal structure during exposure to high velocity, high temperature gas comprising:
   covering the metal structure with a material that ablates for dissipation of energy, said material comprising a material as defined in claim 5.

7. A method as defined in claim 6 wherein said material further comprises from 10 to 20 parts by weight of triphenyl phosphite.

8. A method of forming an ablative insulating body comprising the steps of:
   forming a smooth homogeneous admixture of from 3 to 6 parts by weight of antimony trioxide, from 4 to 7 parts by wetight of tris (2,3-dibromopropyl) phosphate, 15 to 30 parts by weight of thin walled hollow microparticles and 65 to 80 parts by weight of liquid epoxy resin prepared from a diglycidyl ether of Bisphenol A with an epoxide equivalent in the range of 200 to 320 and 20 to 35 parts by weight of siloxane selected from the group consisting of dimethyl siloxane, diethyl siloxane, and methyl phenyl siloxane, the ratio of the epoxy resin to the siloxane being in the range of 65/35 to 80/20 parts by weight, and the total of said epoxy resin and said siloxane being 100 parts by weight,
   adding liquid polyamide-polyamine resin with an amine value of 80 to 320 in the range from 25 to 50 parts by weight to the above admixture,
   forming the resulting mixture into a predetermined configuration,
   curing the mixture in the temperature range from 70° to 220° F., whereby the mixture polymerizes to form a rigid body having the predetermined configuration.

9. A method of protecting a structure from high temperature, high velocity gas by covering the structure with a synthetic resinous material that ablates for dissipating energy comprising the steps of:
   forming a smooth homogeneous admixture of from 3 to 6 parts by weight of antimony trioxide, from 4 to 7 parts by weight of tris (2,3-dibromopropyl) phosphate from 15 to 30 parts by weight of phenolic resin thin-walled hollow microparticles, from 65 to 80 parts by weight of liquid brominated epoxy resin prepared from a diglycidyl ether of Bisphenol A, from 20 to 35 parts by weight of siloxane selected from the group of dimethyl siloxane, diethyl siloxane and methyl phenyl siloxane, the ratio of the epoxy resin to the siloxane being in the range from 65/35 to 80/20 parts by weight and the total of said epoxy resin and said siloxane being 100 parts by weight, mixing from 25 to 35 parts by weight of liquid polyamide-polyamine resin having an amine value of 80 to 320 with the above admixture, forming the resulting mixture into a covering for the structure, and curing the mixture at a temperature less than 220° F. whereby the epoxy resin and polyamide-polyamine resin copolymerize to form a rigid body at least partly covering the structure.

10. A method of insulating a structure with fire retarding material comprising the steps of:

forming a smooth homogeneous admixture of from 1 to 10 parts by weight of antimony trioxide, from 4 to 7 parts by weight of tris (2,3-dibromopropyl) phosphate, 15 to 30 parts by weight of thin-walled hollow microparticles, 75 parts by weight of liquid epoxy resin prepared from a diglycidyl ether of Bisphenol A and 25 parts by weight of siloxane selected from the group consisting of dimethyl siloxane, diethyl siloxane and methyl phenyl siloxane, mixing from 30 to 32 parts by weight of liquid polyamide-polyamine resin with the above admixture, forming the resulting mixture into a predetermined configuration between the structure and a region subject to high temperature exposure, and curing the mixture for a time and at a temperature sufficient to copolymerize the epoxy resin and the polyamide-polyamine resin.

11. An ablative material consisting essentially of:

75 parts by weight of brominated epoxy resin prepared from a diglycidyl ether of Bisphenol A having an epoxide equivalent of 220 to 240, 25 parts by weight of dimethyl siloxane, 30 to 32 parts by weight of liquid polyamide-polyamine resin with an amine value of from 90 to 95, 22 to 25 parts by weight of phenolic resin, thin walled hollow particles, 6.4 to 6.6 parts by weight of tris (2,3-dibromopropyl) phosphate, and 4.5 to 4.7 parts by weight of antimony trioxide in the size range of 0.0001 inch to 0.001 inch.

12. A thermal insulating ablative body comprising:

a glass fabric honeycomb core having individual honeycomb cells filled with an ablative material comprising, 65 to 80 parts by weight of brominated epoxy resin prepared from a diglycidyl ether of Bisphenol A having an epoxide equivalent of 200 to 320, 20 to 35 parts by weight of siloxane selected from the group consisting of dimethyl siloxane, diethyl siloxane, and methyl phenyl siloxane, the ratio of the epoxy resin to the siloxane being in the range from 65/35 to 80/20 parts by weight and the total of said epoxy resin and siloxane being 100 parts by weight, 25 to 35 parts by weight of polyamide-polyamine resin with an amine value of from 80 to 320, 3 to 6 parts by weight of antimony trioxide, 4 to 7 parts by weight of tris (2,3-dibromopropyl) phosphate, and 15 to 30 parts by weight of thin walled hollow microparticles.

References Cited by the Examiner

UNITED STATES PATENTS

| 2,707,708 | 5/1955 | Wittcoff | 260—18 |
| 2,867,592 | 1/1959 | Morris | 260—18 |
| 2,993,014 | 7/1961 | Schardt | 260—2.5 |
| 3,159,499 | 12/1964 | Jorda | 260—18 |

FOREIGN PATENTS

| 930,511 | 7/1963 | Great Britain. |
| 1,107,400 | 12/1961 | Germany. |

OTHER REFERENCES

Lee et al.: Epoxy Resins, p. 161, McGraw-Hill, New York, N.Y., 1957.

MURRAY TILLMAN, *Primary Examiner.*

N. F. OBLON, *Assistant Examiner.*